United States Patent
Tokunaga et al.

(10) Patent No.: US 10,202,291 B2
(45) Date of Patent: Feb. 12, 2019

(54) REVERSE OSMOSIS MEMBRANE APPARATUS AND METHOD OF OPERATING SAME

(71) Applicant: MITSUBISHI HEAVY INDUSTRIES, LTD., Tokyo (JP)

(72) Inventors: Kiichi Tokunaga, Tokyo (JP); Takeshi Yasunaga, Tokyo (JP); Yoshiaki Ito, Tokyo (JP); Yuta Hashimoto, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 494 days.

(21) Appl. No.: 14/769,721

(22) PCT Filed: Feb. 10, 2014

(86) PCT No.: PCT/JP2014/053008
§ 371 (c)(1),
(2) Date: Aug. 21, 2015

(87) PCT Pub. No.: WO2014/129340
PCT Pub. Date: Aug. 28, 2014

(65) Prior Publication Data
US 2016/0002072 A1 Jan. 7, 2016

(30) Foreign Application Priority Data

Feb. 25, 2013 (JP) .................................. 2013-035023

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 65/02* (2013.01);
(Continued)

(58) Field of Classification Search
CPC ................ C02F 1/441; C02F 2209/005; C02F 2103/08; C02F 2103/007; C02F 2303/16;
(Continued)

(56) References Cited

U.S. PATENT DOCUMENTS 6,402,954 B1 * 6/2002 O'Keefe, Jr. .......... B01D 61/22
210/108
2007/0181497 A1 * 8/2007 Liberman ............ B01D 61/025
210/636

(Continued)

FOREIGN PATENT DOCUMENTS

JP 63-59312 A 3/1988
JP 63-197603 U 12/1988

(Continued)

OTHER PUBLICATIONS

International Search Report dated Apr. 22, 2014, issued in counterpart Application No. PCT/JP2014/053008. (9 pages).

(Continued)

*Primary Examiner* — David C Mellon
(74) *Attorney, Agent, or Firm* — Westerman, Hattori, Daniels & Adrian, LLP (57) ABSTRACT

A reverse osmosis membrane apparatus has a plurality of high pressure vessels 12a and 12b in parallel with each other with respect to introducing passage 18 of clarified seawater obtained by subjecting raw seawater to sterilization and removal of relatively large foreign substances. The high pressure vessels 12a and 12b have first-stage reverse osmosis membrane elements 14a and 14b, respectively. Concentrated seawater subjected to membrane separation in the (Continued)

high pressure vessels 12a and 12b flows into a high pressure vessel 16. In the high pressure vessel 16, a plurality of reverse osmosis membrane elements 42 are arranged in series. When a detected value obtained by a differential pressure meter 56a or 56b provided for the high pressure vessel 12a or 12b exceeds a threshold value, introduction of the clarified seawater is stopped, and the reverse osmosis membrane element is washed or replaced.

10 Claims, 6 Drawing Sheets

(51) Int. Cl.
  *B01D 65/02* (2006.01)
  *C02F 103/00* (2006.01)
  *C02F 103/08* (2006.01)

(52) U.S. Cl.
  CPC .... *B01D 2317/06* (2013.01); *B01D 2319/025* (2013.01); *B01D 2321/04* (2013.01); *B01D 2321/40* (2013.01); *C02F 2103/007* (2013.01); *C02F 2103/08* (2013.01); *C02F 2209/005* (2013.01); *C02F 2209/03* (2013.01); *C02F 2303/16* (2013.01); *Y02A 20/131* (2018.01)

(58) Field of Classification Search
  CPC ... C02F 2209/03; B01D 61/025; B01D 65/02; B01D 2321/40; B01D 2321/04; B01D 2319/025; B01D 2317/06; B01D 61/02; B01D 61/022; B01D 61/08; B01D 61/10; B01D 61/12; B01D 2311/14; B01D 2315/20; B01D 2319/02; B01D 2319/022; B01D 2317/02; B01D 2317/027; B01D 2317/04; B01D 2317/022; Y02A 20/131
  See application file for complete search history.

(56) References Cited

U.S. PATENT DOCUMENTS

| | | | |
|---|---|---|---|
| 2010/0133183 | A1 | 6/2010 | Theron et al. |
| 2011/0147309 | A1 | 6/2011 | Palacios Donaque et al. |

FOREIGN PATENT DOCUMENTS

| | | | |
|---|---|---|---|
| JP | 7-144120 | A | 6/1995 |
| JP | 11-128919 | A | 5/1999 |
| JP | 2001-29756 | A | 2/2001 |
| JP | 2001-170458 | A | 6/2001 |
| JP | 2001-191071 | A | 7/2001 |
| JP | 2001-300264 | A | 10/2001 |
| JP | 2002-361054 | A | 12/2002 |
| JP | 3659106 | B2 | 6/2005 |
| JP | 2005-238135 | A | 9/2005 |
| JP | 2006-122787 | A | 5/2006 |
| JP | 3900455 | B2 | 4/2007 |
| JP | 2008-207158 | A | 9/2008 |
| JP | 2011-120996 | A | 6/2011 |
| JP | 2011-224465 | A | 11/2011 |
| JP | 2012-130840 | A | 7/2012 |
| WO | 2005/030647 | A2 | 4/2005 |
| WO | 2012/078975 | A1 | 6/2012 |

OTHER PUBLICATIONS

Notification Concerning Transmittal of International Preliminary Report on Patentability (Form PCT/IB/326), issued in counterpart International Application No. PCT/JP2014/053008 dated Sep. 3, 2015 with Forms PCT/IB/373 and PCT/ISA/237. (6 pages).
Extended (Supplementary) European Search Report (EESR) dated Sep. 16, 2016, issued to the counterpart European Patent Application No. 14754840.8. (6 pages).
Decision to Grant a Patent dated Oct. 28, 2016, issued in counterpart Japanese Application No. 2013-035023, with English translation (6 pages).
Office Action dated Sep. 24, 2018, issued in counterpart European Patent application No. 14754840.8. (4 pages).

\* cited by examiner

REVERSE OSMOSIS MEMBRANE APPARATUS AND METHOD OF OPERATING SAME

TECHNICAL FIELD

The present invention relates to a reverse osmosis membrane apparatus and a method of operating a reverse osmosis membrane which enables reduction of time and effort required for washing or replacement of a reverse osmosis membrane and stable continuous operation of the apparatus.

BACKGROUND

For production of fresh water from seawater or for production of clean water from river or lake water, reverse osmosis membrane apparatuses having a reverse osmosis membrane module, for example, are used. In a reverse osmosis membrane apparatus, a to-be-treated water (clarified water) produced by subjecting e.g. sea, river or lake water as raw water to pretreatment such as sterilization treatment of adding a fungicide into intake sea, river or lake water or a treatment of removing impurities by using e.g. a sand filter, is used. The to-be-treated water is pressurized to have a pressure of about 6.0 MPa by a high pressure pump, for example, and is supplied to a reverse osmosis membrane module, and the to-be-treated water is permitted to pass through a reverse osmosis membrane by reverse osmosis effect by the reverse osmosis membrane module to obtain permeate water to be production water.

A reverse osmosis membrane module is usually composed of a plurality of reverse osmosis membrane elements. An example of the reverse osmosis membrane elements is a spiral-type reverse osmosis membrane element having a structure where a sac-like reverse osmosis membrane having a flow path material therein is spirally wound via a mesh spacer around a center pipe in which permeate water is collected, and a brine seas is provided at an end of the outer peripheral surface, as disclosed in Patent Document 1. Another example of the reverse osmosis membrane elements is a flat membrane-type reverse osmosis membrane element having stacked a plurality of flat sheets of reverse osmosis membrane.

A reverse osmosis membrane module usually has a high pressure vessel and a plurality of reverse osmosis membrane elements arranged in series in the high pressure vessel, and to-be-treated (clarified water) is separated with reverse osmosis membrane elements sequentially from one on the most upstream side into permeate water and concentrated water containing saline matters and impurities to obtain permeate water by each of the reverse osmosis membrane elements. The concentrated water separated from the permeate water by each of the reverse osmosis membrane element is further separated into permeate water and concentrated water by a later stage element of the reverse osmosis membrane elements. Therefore, the salinity and concentration of impurities of concentrated water are higher at relatively downstream side. Patent Document 2 discloses a construction where a plurality of high pressure vessels each having a spiral-type reverse osmosis membrane element therein, is connected to a to-be-treated water introducing passage and arranged in parallel.

Figure 6:
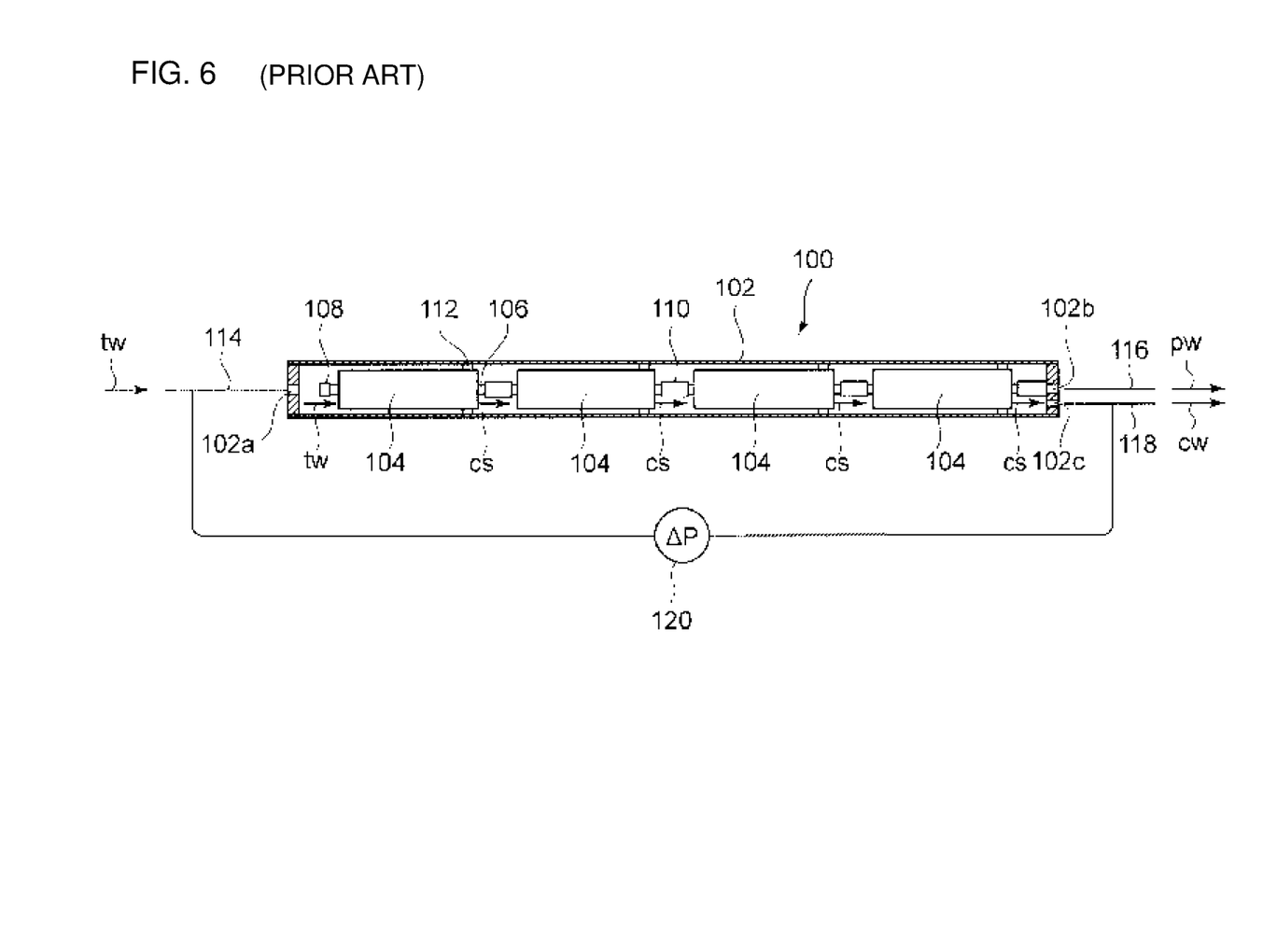
FIG. 6 is a longitudinal sectional view of a conventional reverse osmosis membrane apparatus.

FIG. 6 shows an example of a construction of a reverse osmosis membrane module having a high pressure vessel and spiral-type reverse osmosis membrane elements arranged in series therein, which is disclosed in Patent Document 1. In FIG. 6, the reverse osmosis membrane apparatus 100 comprises a high pressure vessel 102 and four to eight reverse osmosis membrane elements 104 arranged in series in the high pressure vessel 102. To-be-treated water tw is supplied at a high pressure to an inlet opening 102a of the high pressure vessel 102 from a to-be-treated water supply passage 114. If it is assumed that among the plurality of reverse osmosis membrane elements arranged in series, a reverse osmosis membrane on an upstream side of the flow of the to-be-treated water tw is an earlier stage element and a reverse osmosis membrane on a downstream side of the flow of the to-be-treated water tw is a later stage element, the to-be-treated water tw is flown into an inlet end of the earliest-stage element of the reverse osmosis membrane elements 104 and separated into permeate water pw and concentrated water cs by the reverse osmosis membrane in the reverse osmosis membrane element 104a.

The permeate water pw is flown into the center pipe 106, and the concentrated water cw is flown out from the outlet of the earliest-stage reverse osmosis membrane element. The inlet of the center pipe 106 of the earliest-stage reverse osmosis membrane element 104a is obstructed with an end cap 108. The center pipe 106 of each of the reverse osmosis membrane elements 104 is connected with a connector 110. Accordingly, the permeate water pw from each of the reverse osmosis membrane elements joins together and is discharged from an outlet opening 102b of the high pressure vessel 102 to a permeate water outflow passage 116.

As the interior of the high pressure vessel 102 is partitioned with brine seals 112 provided on outer peripheral surface of each of the reverse osmosis membrane elements 104, the concentrated water cw flown out of each of the reverse osmosis membrane elements 104 is flown into the later stage element of the reverse osmosis membrane elements as to-be-treated water without going past the reverse osmosis membrane element of the later stage. The concentrated water cw is thereby permeated sequentially with the reverse osmosis membrane elements. The concentrated water cw discharged from the reverse osmosis membrane element 104 in the last stage is discharged from an outlet opening 102c formed at the outlet end of the high pressure vessel 102 to a concentrated water discharging passage 118.

A differential pressure meter 120 for detecting the differential pressure between the pressure of the to-be-treated water tw flowing in the to-be-treated water introducing passage 114 and the pressure of the concentrated water cw flowing in the concentrated water discharging passage 118 is provided.

The method of washing the reverse osmosis membrane element 100 was such that when the detected value by the differential pressure meter 120 exceeds the threshold deposition amount of fouling matters such as hardly-soluble ingredients, high molecular solute, colloids, or tiny solid materials deposited in the reverse osmosis membranes is defined as exceeding the threshold limit, and then the operation of the reverse osmosis membrane apparatus 100 was stopped, and washing was carried out. When the differential pressure between the to-be-treated water tw flowing in the to-be-treated water introducing passage 114 and the permeate water pw flowing in the permeate water outflow passage 116 exceeds the threshold, the same washing method as described above may be applied. Accordingly, the difference in pressure between the to-be-treated water tw flowing in the to-be-treated water introducing passage 114 and the permeate water pw flowing in the permeate water outflow passage 116 may be detected.

CITATION LIST

Patent Literature

Patent Document 1: JP 2001-300264 A
Patent Document 2: JP 2001-191071 A

SUMMARY

Technical Problem

Among the reverse osmosis membrane elements arranged in series, deposition of fouling matters in the reverse osmosis membrane is more concentrated in the reverse osmosis membrane element disposed in the earlier stage. On the other hand, in a case where the to-be-treated water is seawater containing saline matters, the concentration of metal ions such as Ca or Mg in the concentrated seawater is higher in the reverse osmosis membrane element disposed in the later stage. Since such metal ions may react with e.g. $CO_2$ dissolved in the seawater to generate scale, the deposition amount of scale deposited in the reverse osmosis membrane is larger in the reverse osmosis membrane element disposed in the later stage. Although such scale may be removed by feeding chemicals such as citric acid or HCl, there is a problem such that the amount of the chemicals and thereby the cost tend to be increased.

As described above, in a conventional washing method, the plurality of reverse osmosis membrane elements arranged in series in a high pressure vessel are washed at once. Accordingly, reverse osmosis membrane elements in the intermediate part having only small amount of fouling (clogging) would be washed excessively, and thus there is a problem such that waste of time and chemicals for washing becomes large. In addition, although damage to the reverse osmosis membrane by washing is inevitable, such the reverse osmosis membrane would be damaged excessively. Further, in monitoring using a differential pressure meter, since the differential pressure of accumulation of the plurality of the reverse osmosis membrane elements, the sensitivity to detect the differential pressure is not high. Thus, a proper timing for washing could be overlooked.

Further, in a case where fouling matters deposited in the reverse osmosis membrane cannot be completely removed, the reverse osmosis membrane element needs to be replaced. However, since it is necessary to open the high pressure vessel having a plurality of reverse osmosis membrane elements therein to carry out replacement, there is a problem that much time and effort are required.

In view of the above problems, an object of the present invention is, in a reverse osmosis membrane apparatus having a high pressure vessel and a plurality of reverse osmosis membrane elements arranged in series in the high pressure vessel where to-be-treated water (clarified water) obtained by subjecting raw water to pretreatment is separated into concentrated water and permeate water with the reverse osmosis membrane elements sequentially from the first stage element to obtain permeate water, to reduce time and effort required for washing of the reverse osmosis membrane apparatus and thereby to increase operating rate and to enable stable operation of the reverse osmosis membrane apparatus.

Solution to Problem

In order to accomplish the object, the reverse osmosis membrane apparatus according to the present invention comprises:

a plurality of first high pressure vessels arranged in parallel with each other and connected to an introducing passage of the to-be-treated water and having first reverse osmosis membrane elements therein, respectively, each of the first reverse osmosis membrane elements being, among the plurality of reverse osmosis membrane elements arranged in series, a reverse osmosis membrane element in an earlier stage (disposed on an upstream side of a flow of the to-be-treated water), in which fouling is deposited in a relatively large amount, or a reverse osmosis membrane element in a later stage (disposed on a downstream side of the flow of the to-be-treated water);

a second pressure vessel arranged in series in relation to the first high pressure vessels and having therein second reverse osmosis membrane elements other than the first reverse osmosis membrane elements among the plurality of reverse osmosis membrane elements, the second reverse osmosis membrane elements being arranged in series;

a deposition amount detector for detecting a deposition amount of fouling matters deposited in a reverse osmosis membrane of the first reverse osmosis membrane elements; and a flow path switching device configured, when the deposition amount of the fouling matters deposited in one of the first reverse osmosis membrane elements exceeds a threshold value, to stop introducing the to-be-treated water into the first high pressure vessel having the one of the first reverse osmosis membrane elements therein and to permit the to-be-treated water to flow into the other of the first reverse osmosis membrane elements arranged in parallel with the one of the first reverse osmosis membrane elements.

According to the present invention, among the plurality of reverse osmosis membrane elements arranged in series, the first reverse osmosis membrane elements which are disposed in the earlier stage where the amount of fouling is relatively large or which are disposed in the later stage, are accommodated in a high pressure vessel other than a high pressure vessel which accommodates the other reverse osmosis membrane elements. The deposition amount of fouling matters only in the first reverse osmosis membrane elements is detected, and when the deposition amount exceeds the threshold value, washing or replacement is carried out only for the first reverse osmosis membrane elements. Since the frequency of washing or replacement for the second reverse osmosis membrane elements is low, washing or replacement can be separately carried out when needed.

According to the present invention, by arranging in parallel with each other the first high pressure vessels each having only the reverse osmosis membrane element disposed in the earlier stage where the amount of fouling is relatively large or disposed in the later stage, even if one of the reverse osmosis membrane element is stopped for maintenance such as washing or replacement, it is possible to continue the operation by supplying the to-be-treated water to the reverse osmosis membrane element of the other of the first high pressure vessel. Further, by setting a timing for washing or replacement with regard to the reverse osmosis membrane element disposed in the earlier stage or in the later stage independently from the second reverse osmosis membrane elements, it is possible to reduce waste of washing chemicals thereby to reduce the cost. Further, when a reverse osmosis membrane element of which fouling deposition amount is large is needed to be washed or replaced, it is only necessary to open the high pressure vessel which accommodates the first reverse osmosis membrane element, whereby it is possible to reduce effort for washing or replacement and to reduce the time required for washing or replacement.

In an embodiment of the present invention, the reverse osmosis membrane apparatus may comprise: a washing fluid supplying part for supplying the reverse osmosis membrane of the first reverse osmosis membrane element with washing fluid; and a washing fluid discharging passage for discharging the washing fluid after washing of the reverse osmosis membrane of the first reverse osmosis membrane element. It is thereby possible to peel off the fouling matters deposited in the reverse osmosis membrane by peeling action of the washing fluid on the reverse osmosis membrane. Accordingly, it enables washing where environmental burden is small without relying on washing ability of chemicals having a strong washing effect such as acids and alkalis.

In such a case, a flow of washing fluid contacting with the reverse osmosis membrane along the reverse osmosis membrane may be formed, or, a flow passing through the reverse osmosis membrane by the flow of the washing fluid may be formed. The flow of the washing fluid along the reverse osmosis membrane can be formed by a flow of the washing fluid flowing between the to-be-treated water introducing passage and the concentrated water discharging passage, and the flow of the washing fluid passing through the reverse osmosis membrane can be formed by a flow of the washing fluid introduced from the permeate water passage to the reverse osmosis membrane, for example.

In an embodiment, the deposition amount detector may comprise: a differential pressure detector for detecting a differential pressure between a pressure of the to-be-treated water flowing in a to-be-treated introducing passage of the first reverse osmosis membrane element and a pressure of the concentrated water flowing in a concentrated water discharging passage; and a deposition amount calculation device for calculating the deposition amount of the fouling matters from a detected value by the differential pressure detector. According to this configuration, it is possible to accurately detect the deposition amount of the fouling matters in the first reverse osmosis membrane element where the fouling deposition amount is large, whereby it is possible to accurately determine the timing for washing or replacement of the first reverse osmosis membrane element.

In an embodiment of the present invention, the reverse osmosis membrane apparatus may further comprise an alarm generator for generating an alarm when the deposition amount of the fouling matters detected by the deposition amount detector exceeds a threshold value. It is thereby possible to know without delay the timing when washing or replacement of the first reverse osmosis membrane is required.

In an embodiment of the present invention, a plurality of the second high pressure vessels may be arranged in parallel with each other and connected to a concentrated water outflow passage provided for the first high pressure vessel. It is thereby possible to increase the manufacturing ability of permeate water or to make the manufacturing ability of permeate water variable, and to wash or replace the reverse osmosis membrane element accommodated in one of the second pressure vessels without stopping the reverse osmosis membrane apparatus.

The method of operating the reverse osmosis membrane apparatus according to an embodiment of the present invention comprises: a flow path switching step of, when the alarm is generated by the alarm generator, stopping introduction of the to-be-treated water to the one of the first reverse osmosis membrane elements having deposited fouling matters of which the deposition amount exceeds the threshold value, and introducing the to-be-treated water into the other of the first reverse osmosis membrane elements by the flow path switching device; and a washing step of supplying washing fluid from the washing fluid supplying part, peeling off the fouling matters deposited in the reverse osmosis membrane of the first reverse osmosis membrane element by flow of the washing fluid, and then discharging the washing fluid from the washing fluid discharging passage. According to the method, in addition to the above effect obtained by the apparatus according to the present invention, it is possible to know the timing when washing of the first reverse osmosis membrane element is required without delay by the alarm signal.

In an embodiment, in the washing step, as the washing fluid, the to-be-treated water may be supplied to the first reverse osmosis membrane element via a permeate water passage at a pressure lower than an osmotic pressure caused by the reverse osmosis membrane of the first reverse osmosis membrane element, and the permeate water is permitted to flow backward from the permeate water passage through the reverse osmosis membrane element to the to-be-treated water side by a pressure difference between the osmotic pressure of the to-be-treated water and a pressure of the permeate water having no osmotic pressure, utilizing the difference in the salinity between the permeate water and the to-be-treated water. It thereby enables energy-saving washing with a small environmental burden with a low power without using chemicals having a strong washing effect as the washing fluid.

Advantageous Effects

According to the preset invention, a plurality of high pressure vessels have therein only the first reverse osmosis membrane elements in which the fouling deposition amount is large, respectively, and the plurality of high pressure vessels are arranged in parallel with each other and connected to the to-be-treated water introducing passage, whereby it is possible to reduce the effort and time required to wash the reverse osmosis membrane apparatus and to increase the operation rate of the reverse osmosis membrane apparatus to enable stable operation of the apparatus.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

Figure 1:
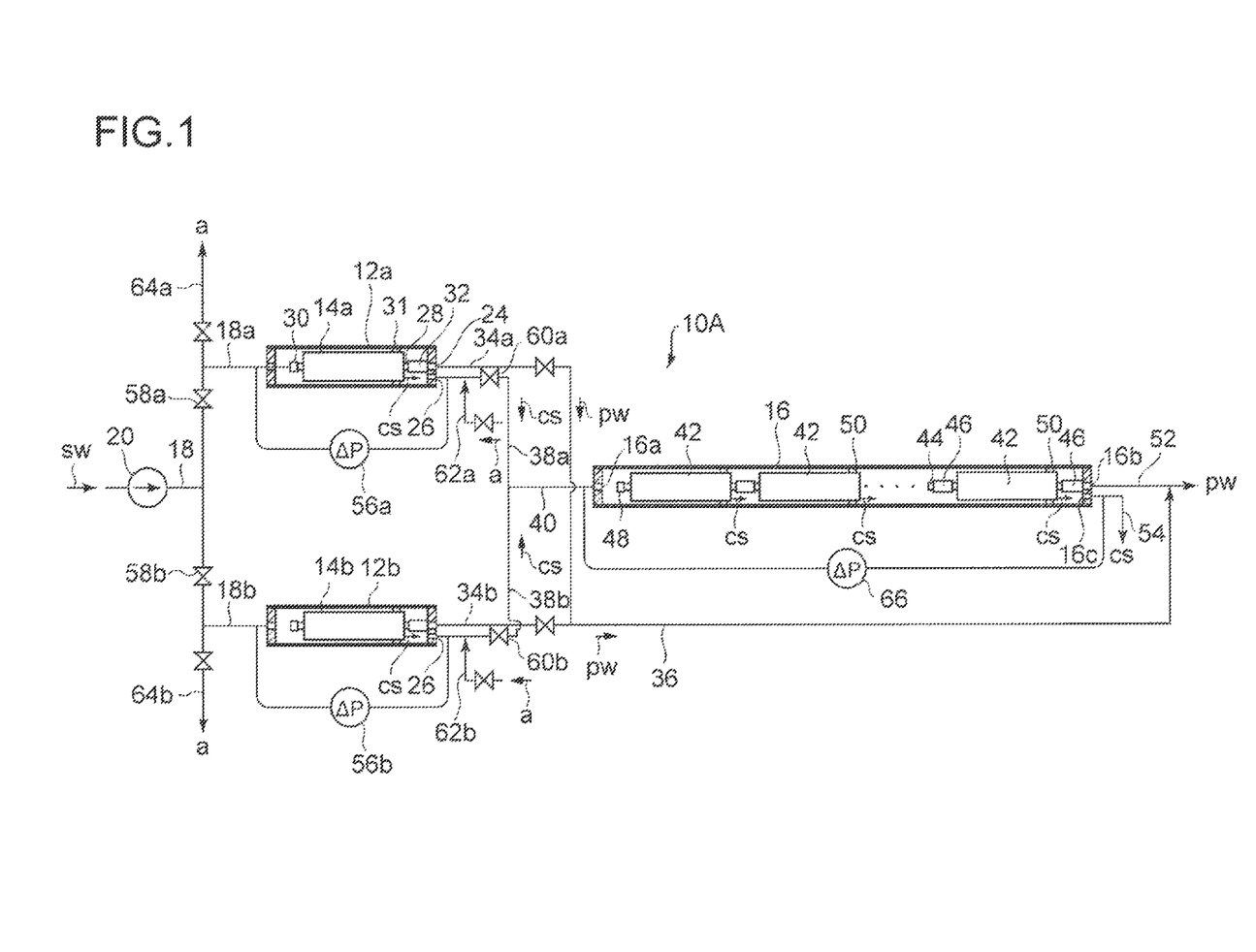
FIG. 1 is a flow diagram of a reverse osmosis membrane apparatus according to a first embodiment of the present invention.

A first embodiment of the present invention will now be described with reference to FIG. 1. This embodiment is an example of a reverse osmosis membrane apparatus applied to a seawater desalination plant. To-be-treated water used in this embodiment illustrated in FIG. 1 is obtained by subjecting introduced raw seawater to pretreatment of sterilization and removal of relatively large foreign substances such as dusts and microbes. The clarified seawater sw subjected to the pretreatment is used as the to-be-treated water. The reverse osmosis membrane apparatus 10A has two high pressure vessels 12a and 12b connected to an introducing passage 18 of clarified seawater 18 via introducing branched passages 18a and 18b, respectively. Inside the high pressure vessels 12a and 12b, reverse osmosis membrane elements 14a and 14b are housed, respectively.

Clarified seawater sw is supplied to an inlet opening 22 of the high pressure vessel 12a or 12b via the introducing branched passage 18a or 18b at a high pressure by a pump 20 provided on the clarified seawater introducing passage 18. Clarified water sw is flown into the reverse osmosis membrane element 14a or 14b from the inlet end of the reverse osmosis membrane element 14a or 14b and is separated into permeate water pw and concentrated seawater cs by the reverse osmosis membrane. The high pressure vessels 12a and 12b may be operated simultaneously, or, only one of the high pressure vessels 12a and 12b may be operated.

The permeate water pw is flown into a center pipe 28, and the concentrated seawater cs is flown out from an outlet end of the reverse osmosis membrane element 14a or 14b. The inlet of the reverse osmosis membrane element 14a or 14b is obstructed with an end cap 30. The center pipe 28 is connected to an outlet opening 24 of the high pressure vessel 12a or 12b with a connector 32, and the permeate water pw is flown out from the center pipe 28 via the outlet opening 24 to a permeate water outflow passages 34a or 34b. The permeate water outflow passages 34a and 34b are connected to one permeate water assembly pathway 36. The interior of the high pressure vessel 12a or 12b is partitioned with a brine seal 31 provided on outer peripheral surface of the reverse osmosis membrane element 14a or 14b.

The concentrated seawater cs is flown out from the outlet end of the reverse osmosis membrane element 14a or 14b. An outlet opening 26 is formed at the outlet end of the high pressure vessel 12a or 12b, and the outlet opening 26 is connected to a concentrated seawater outflow passage 38a or 38b. The concentrated seawater outflow passages 38a and 38b are joined to one concentrated seawater assembly pathway 40, and the concentrated seawater assembly pathway 40 is connected to an inlet opening 16a of a high pressure vessel 16. The configuration of the high pressure vessel 16 and its interior is basically the same as the high pressure vessel 102 and its interior shown in FIG. 6.

That is, in the high pressure vessel 16, a plurality of reverse osmosis membrane elements 42 are arranged in series. Permeate water pw from each of the reverse osmosis membrane elements is flown into a center pipe 44 which is connected to another center pipe with a connector 46, and the permeate water pw from each of the reverse osmosis membrane elements joins in the center pipe 44. A center pipe 11 is connected to an outlet opening 16b of the high pressure vessel 16 with a connector 46. The permeate water pw from each of the reverse osmosis membrane elements is flown out from the outlet opening 16b to the permeate water outflow passage 52. The permeate water assembly pathway 36 is connected to the permeate water outflow passage 52. The front end of the center pipe 44 of the earliest-stage reverse osmosis membrane element 42 is obstructed with an end cap 48, and the interior of the high pressure vessel 16 is partitioned with a brine seal 50 provided on outer peripheral surface of each of the reverse osmosis membrane elements.

Concentrated seawater cs concentrated by the reverse osmosis membrane element 14a or 14b is flown from the concentrated seawater assembly pathway 40 into the inside of the high pressure vessel 16. The concentrated seawater cs flown into the high pressure vessel 16 is firstly separated into concentrated seawater cs and permeate water pw with the earliest-stage reverse osmosis membrane element 42. This permeate water pw is flown into the center pipe 46, while the concentrated seawater cs is flown from the outlet end of the earliest-stage reverse osmosis membrane element 42 and then is concentrated with each of the subsequent reverse osmosis membrane elements sequentially. An outlet opening 16c is formed at the outlet end of the high pressure vessel 16, and a concentrated seawater outflow passage 54 is connected to the outlet opening 16c. The concentrated seawater cs separated by the last-stage reverse osmosis membrane element 42 is flown out from the outlet opening 16c to the concentrated seawater outflow passage 54.

In the high pressure vessel 12a, provided is a differential pressure meter 56a for detecting a pressure difference between the clarified seawater sw flowing in the introducing branched passage 18a and the concentrated seawater cs flowing in the concentrated seawater outflow passage 34a. In the high pressure vessel 12b, provided is a differential pressure meter 56b for detecting a pressure difference between the clarified seawater sw flowing in the introducing branched passage 18b and the concentrated seawater cs flowing in the concentrated seawater outflow passage 38b. In the introducing branched passages 18a and 18b and in the concentrated seawater outflow passages 38a and 38b, provided are gate valves 58a, 58b, 60a and 60b, respectively, for switching a flow path.

To the concentrated seawater outflow passages 38a and 38b, washing fluid supplying passages 62a and 62b are connected, respectively, and to the introducing branched passages 18a and 18b, washing fluid discharging passages 64a and 64b are connected, respectively. In the high pressure vessel 16, a differential pressure meter 66 for detecting a differential pressure between the concentrated seawater cs flowing in the concentrated seawater outflow passage 40 and the concentrated seawater cs flowing in the concentrated seawater outflow passage 54.

Figure 2:
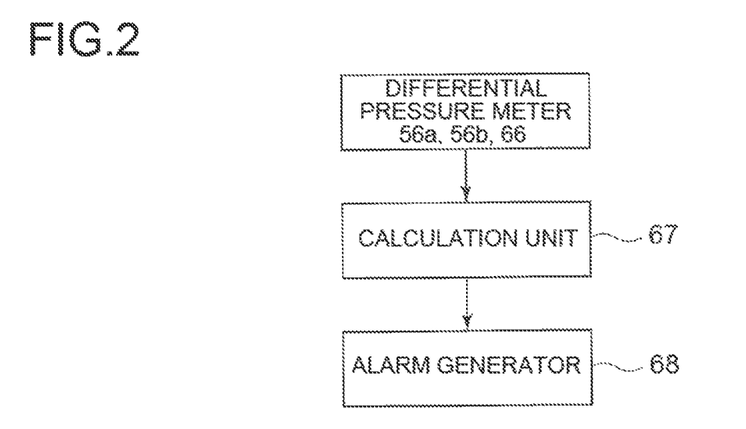
FIG. 2 is a block diagram illustrating a control system for the reverse osmosis membrane apparatus according to the first embodiment.

FIG. 2 is a block diagram illustrating a control system for the reverse osmosis membrane apparatus 10A. The detected values by the differential pressure meters 56a, 56b and 66 are sent to a calculation unit 67. The calculation unit 67 is configured to calculate the deposition amount of fouling matters from the input detected values. If the calculated deposition amount exceeds a threshold value, the calculation unit sends an alarm signal to an alarm generator 68. The alarm generator 68 generates an alarm when receiving the alarm signal.

With such a configuration, when the reverse osmosis membrane apparatus 10A is operated, by operating the gate valves 58a, 58b, 60a and 60b, the clarified seawater sw is introduced into one or both of the high pressure vessels 12a and 12b, and in a case of maintenance or inspection of one of the high pressure vessels, the clarified seawater sw is introduced into only one of the high pressure vessels. The permeate water pw separated by the reverse osmosis membrane element 14a or 14b within the high pressure vessel 12a or 12b is flown out to the permeate water outflow passage 52 via the permeate water outflow passage 34a or 34b, and the permeate water assembly pathway 36. The concentrated seawater cs is flown into the high pressure vessel 16 via the concentrated seawater outflow passage 38a or 38b and the concentrated seawater outflow passage 40, and is separated into concentrated seawater and permeate water pw by the reverse osmosis membrane elements 42 in the high pressure vessel 16 sequentially from the upstream side.

The permeate water pw separated by the reverse osmosis membrane element 42 disposed in the last stage is flown to the permeate water outflow passage 52, and the concentrated seawater cs is flown out from the concentrated seawater outflow passage 54. During operation, the differential pressure meters 56a, 56b and 66 are monitored, and if the deposition amount of the fouling matters calculated by the calculation unit 67 on the basis of the detected values obtained by the differential pressure meters, the gate valves 58a, 58b, 60a and 60b are operated to stop supplying the clarified seawater sw to stop supplying the clarified seawater sw to the reverse osmosis membrane element of which deposition amount exceeds the threshold value and to start the washing step of the reverse osmosis membrane element.

For example, in the washing step of washing the reverse osmosis membrane element 14a, a washing fluid a is fed from the washing fluid supplying passage 62 to from a flow of washing fluid contacting the surface of the reverse osmosis membrane of the reverse osmosis membrane element 14a. The washing fluid a after washing the reverse osmosis membrane is discharged from the washing fluid discharging passage 64a. In a case of the reverse osmosis membrane element 14b, washing may be carried out in the same manner as above. Since the deposition amount in the reverse osmosis membrane element 42 in the high pressure vessel 16 is small, the required frequency of washing is low; however, if the deposition amount exceeds the threshold value, the washing may be carried out in the same manner as above.

When the fouling matters are not completely removed despite washing the reverse osmosis membrane element may be replaced.

According to the embodiment, since only the reverse osmosis membrane element 14a or 14b disposed in an earlier stage where the fouling amount is large, it is possible to reduce waste of washing chemicals thereby to reduce the cost. Further, since the high pressure vessels 12a and 12b having the reverse osmosis membrane elements 14a and 14b, respectively, of which the frequency of washing is high, it is possible to continue operation of one of the reverse osmosis membrane element in a case where the other one is being washed. Accordingly, it is possible to keep the operation rate of the reverse osmosis membrane apparatus 10A high and to operate the apparatus stably. Further, it is only necessary to open the high pressure vessel 12a or 12b having the reverse osmosis membrane element 14a or 14b therein, it is possible to reduce effort and time required for the washing.

Further, the flow of the washing fluid has action on the reverse osmosis membrane, whereby it is possible peel off the fouling matters deposited in the reverse osmosis membrane. Accordingly, it is possible to carry out washing where environmental burden is small without relying on washing ability of chemicals having a strong washing effect such as acids and alkalis. In the embodiment, each of the high pressure vessels 12a and 12b has one reverse osmosis membrane element; however, according to the present invention, the number of the reverse osmosis membrane element is not limited to one, and a plurality of the reverse osmosis membrane elements may be housed in the high pressure vessel 12a or 12b.

(Second Embodiment)

Figure 3:
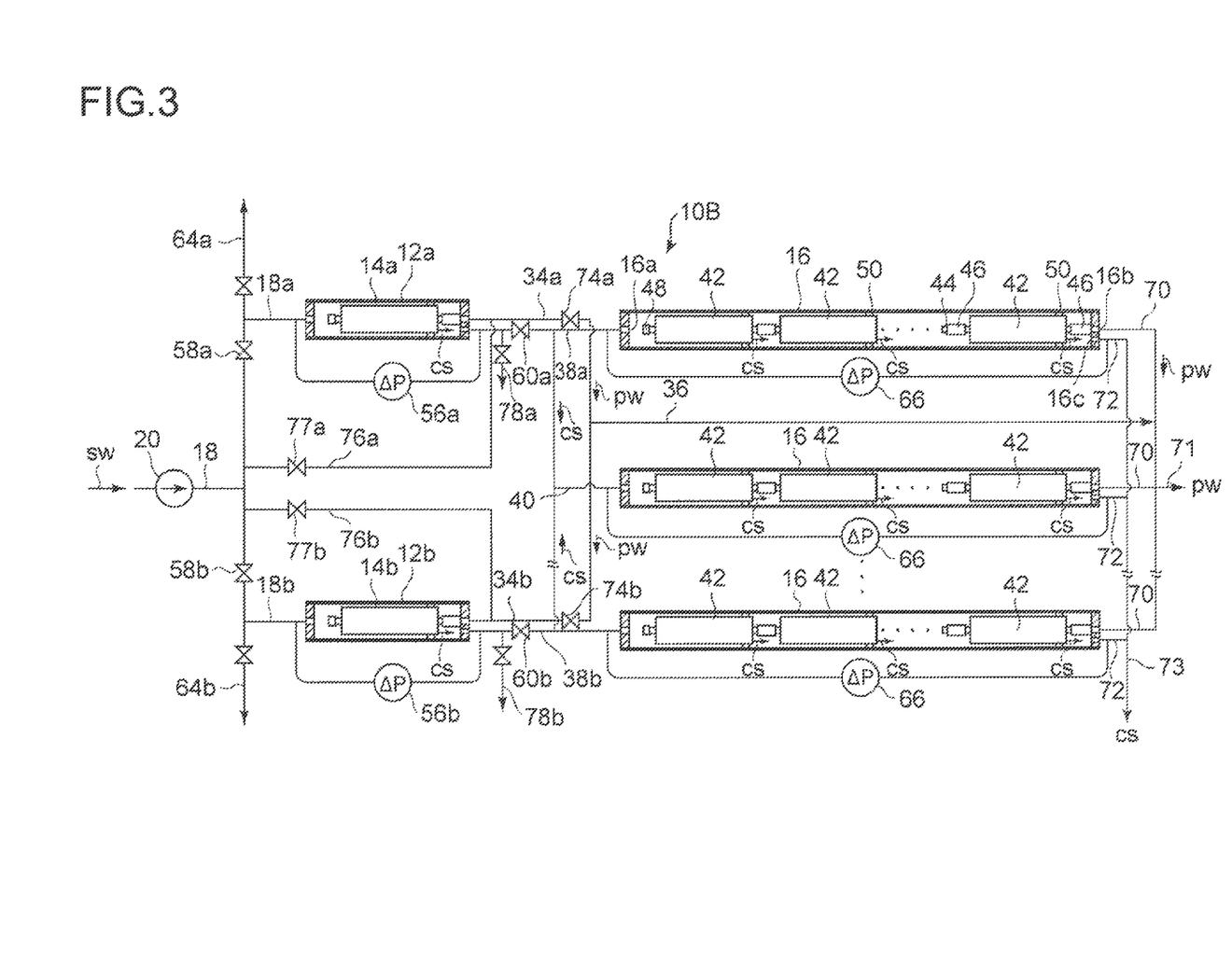
FIG. 3 is a flow diagram of a reverse osmosis membrane apparatus according to a second embodiment of the present invention.

A second embodiment of the present invention will now be described with reference to FIG. 3. In contrast to the first embodiment, a reverse osmosis membrane apparatus 10B according to the second embodiment has plurality of high pressure vessels 16 each having therein a plurality of reverse osmosis membrane elements 42 arranged in series, the plurality of high pressure vessels 16 being arranged in parallel with one another and connected to the concentrated seawater outflow passage 40. Each of the high pressure vessels 16 and the inner structure thereof are the same as the high pressure vessel 16 according to the first embodiment and the inner structure thereof. The permeate water outflow passages 70 respectively connected to the outlet openings 16b of the high pressure vessels 16 are joined with the concentrated seawater assembly pathway 73. The concentrated seawater outflow passages 72 respectively connected to the outlet openings 16c of the high pressure vessels 16 are joined with the concentrated seawater assembly pathway 73.

In the permeate water outflow passages 34a and 34b, to which the permeate water pw is flown from the high pressure vessels 12a and 12b, respectively, gate valves 74a and 74b are provided, respectively. A bypass pathway 76a branched from the introducing branched passage 18a on an upstream position of the gate valve 58a and connected to the permeate water outflow passage 34a on an upstream position of the gate valve 74a is provided. A bypass pathway 76b branched from the introducing branched passage 18b on an upstream position of the gate valve 58b and connected to the permeate water outflow passage 34b on an upstream position of the gate valve 74b is provided. In the bypass pathway 76a, and 76b, gate valves 77a and 77b are provided, respectively. Further, clarified seawater discharging passages 78a and 78b for discharging clarified seawater supplied as a washing fluid at the time of the washing step are provided to the permeate water outflow passages 34a and 34b. The rest of the configuration is basically the same as in the first embodiment.

In this embodiment, a plurality of high pressure vessels 16 are arranged in parallel to each other with respect to each of the concentrated seawater outflow passages 38a and 38b of the high pressure vessels 12a and 12b, whereby it is possible to increase the ability of manufacturing permeate water pw. In the washing step, in a case where the reverse osmosis membrane element 14a housed in the high pressure vessel 12a is washed, for example, the gate valves 58a, 74a and 60a are closed, and the gate valve 77 is opened. Then, the clarified seawater sw is supplied from the bypass pathway 76a to the permeate water outflow passage 34a at a pressure lower than the osmotic pressure generated by the reverse osmosis membrane of the reverse osmosis membrane element 14a by using the pump 20.

By such a configuration, the mixture flow of the permeate water pw and the clarified seawater sw reaches the reverse osmosis membrane of the reverse osmosis membrane element 14a, and only the permeate water pw in the mixture flow is passed through the reverse osmosis membrane. By the pressure difference between the clarified seawater sw with an osmosis pressure generated at this time and the permeate water pw having no osmosis pressure, the permeate water pw from the permeate water outflow passage 34a is allowed to pass through the reverse osmosis membrane. The fouling matters deposited in the reverse osmosis membrane can be peeled off by the permeate water pw passing through the reverse osmosis membrane.

The permeate water pw passed through the reverse osmosis membrane by the forward osmosis phenomenon is discharged from the washing fluid discharging passage 64a, and the clarified seawater sw supplied to the reverse osmosis membrane element 14a is discharged from the clarified seawater discharging passage 78a. In a case of washing the reverse osmosis membrane element 14b housed in the high pressure vessel 12b, washing may be carried out in the same manner. When the fouling matters cannot be removed despite washing the reverse osmosis membrane element, the reverse osmosis membrane element may be replaced.

According to the embodiment, in addition to the effect obtainable by the first embodiment, by using the osmosis pressure of the clarified seawater sw to wash the reverse osmosis membrane element, it is possible to actuate the pump 20 with a reduced power. Further, it enables washing where environmental burden is small without relying on washing ability of chemicals having a strong washing effect.

(Third Embodiment)

Figure 4:
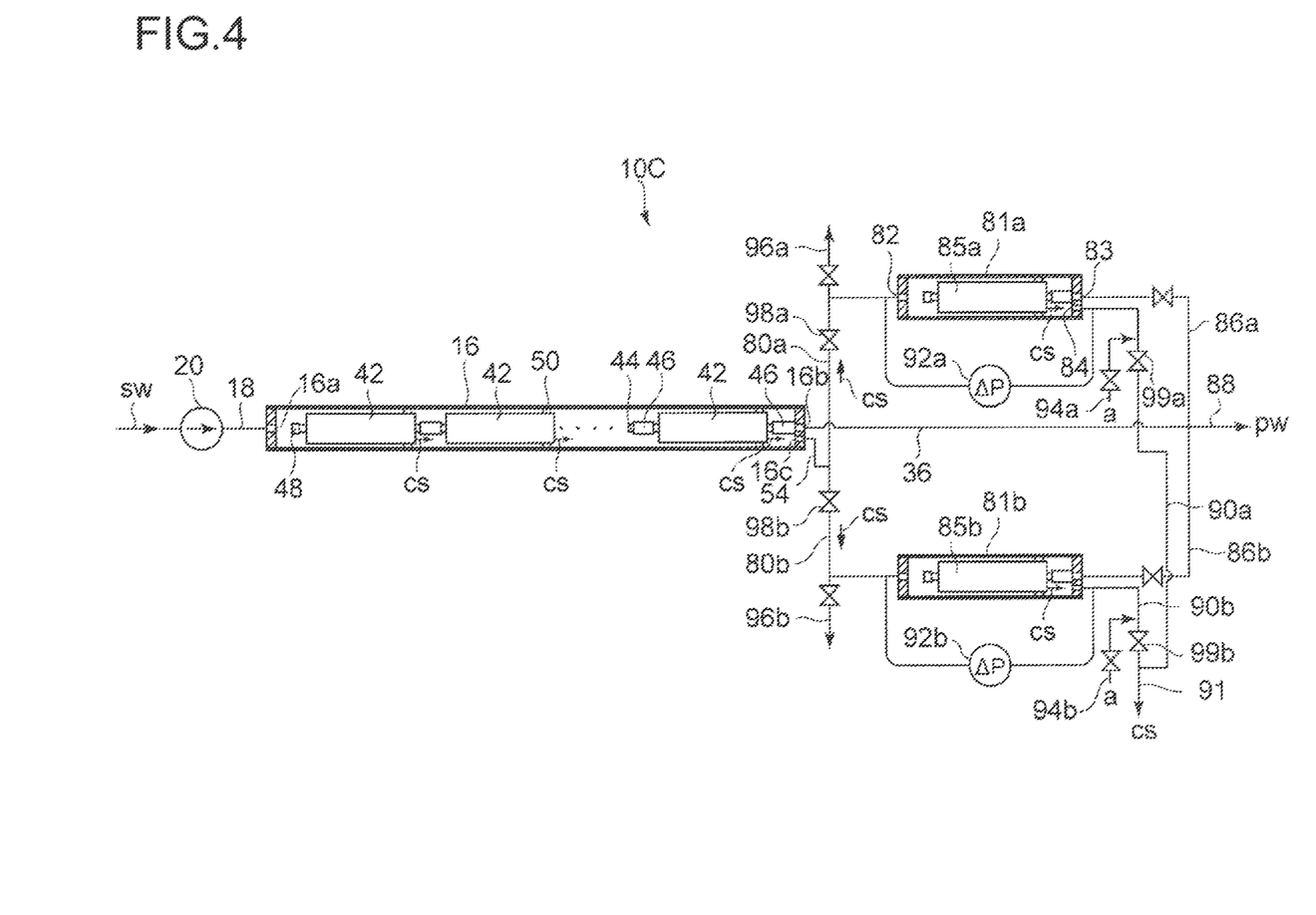
FIG. 4 is a flow diagram of a reverse osmosis membrane apparatus according to a third embodiment of the present invention.

A third embodiment of the present invention will now be described with reference to FIG. 4. The reverse osmosis membrane apparatus 10C has the same configuration as the high pressure vessel 16 illustrated in FIG. 1 or FIG. 3 and the inner structure thereof, and it has a high pressure vessel 16 having a plurality of reverse osmosis membrane elements 42 arranged in series therein. A clarified seawater introducing passage 18 is connected to the inlet end of the high pressure vessel 16; a concentrated seawater outflow passage 54 is branched into a branched outflow passages 80a and 80b; the branched outflow passage 80a is connected to an inlet opening 82 of the high pressure vessel 81a; and the branched outflow passage 80b is connected to an inlet opening of the high pressure vessel 81b. The high pressure vessels 81a and 81b and the inner structure thereof are the same as the high pressure vessel 12a or 12b and the inner structure according to the first embodiment or the second embodiment.

The high pressure vessel 81a has one reverse osmosis membrane element 85a therein, and the high pressure vessel 81b has one reverse osmosis membrane element 85b therein. Permeate water pw separated by the reverse osmosis membrane elements 85a and 85b from the permeate water outflow passages 86a and 86b, respectively, is flown into a permeate water assembly pathway 88. The concentrated seawater cs is flown from outlet openings 84 into concentrated seawater outflow passages 90a and 90b and then joins together into a concentrated seawater assembly pathway 91. A differential pressure meter 92a for detecting the differential pressure between the concentrated seawater cs flowing in the branched outflow passage 80a and the concentrated seawater cs flowing in the concentrated seawater outflow passage 90a is provided, and a differential pressure meter 92b for detecting the differential pressure between the concentrated seawater cs flowing in the branched outflow passage 80b and the concentrated seawater cs flowing in the concentrated seawater outflow passage 90b is provided.

Washing fluid supply passages 94a and 94b are connected to the concentrated seawater outflow passages 90a and 90b, respectively. Gate valves 98a and 98b are provided on the branched outflow passages 80a and 80b, respectively, and washing fluid discharging passages 96a and 96b are connected to the branched outflow passages 80a and 80b, respectively. Gate valves 99a and 99b are provided on the concentrated seawater outflow passages 90a, and 90b, respectively.

In such a configuration, concentrated seawater cs concentrated sequentially by the plurality of reverse osmosis membrane elements 42 housed in the high pressure vessel 16 is introduced to one or both of the high pressure vessels 81a and 81b. In a case of maintenance or inspection of one of the high pressure vessels, the concentrated seawater cs is introduced to the other one.

As described above, the concentrated seawater cs introduced to the last-stage reverse osmosis membrane element 85a or 85b contains metal ions such as Ca and Mg at a high concentration. As such ions may react with e.g. $CO_2$ dissolved in the seawater to generate scale, the deposition amount of the scale deposited in the reverse osmosis membrane of the reverse osmosis membrane element 85a or 85b may be rapidly increased.

During operation of the reverse osmosis membrane apparatus 10C, if the detected value of the differential pressure meter 66, 92a or 92b exceeds a threshold value, introduction of concentrated seawater cs to the high pressure vessel corresponding to the differential pressure meter of which the detected value exceeds the threshold is stopped, and the washing step is carried out. The washing step is carried out in the same manner as in the above first embodiment. For example, when the detected value of the differential pressure meter 92a exceeds the threshold value, the gate valves 98a, 98b, 99a and 99b are operated to stop introducing clarified seawater sw to the reverse osmosis membrane element 85a, and the washing step is carded out.

In the washing step, firstly, washing fluid is supplied from the washing fluid supply passage 94a to form a flow of the washing fluid so that the flow contacts with a surface of the reverse osmosis membrane element 85a, and then the washing fluid is discharged from the washing fluid discharging passage 96a. In a case where the reverse osmosis membrane element 85b housed in the high pressure vessel 81b is washed, the same operation is carry out.

According to this embodiment, as the high pressure vessels 81a and 81b having therein the last-stage reverse osmosis membrane elements 85a and 85b where the fouling amount is large, respectively, are arranged in parallel with each other with regard to the concentrated seawater outflow passage 54, when one of the high pressure vessels is washed, operation of the other one can be continued, whereby it is possible to keep the operating rate of the reverse osmosis membrane apparatus 10C and to operate the apparatus stably. Further, apart from the reverse osmosis membrane elements 42 housed in the high pressure vessel 16, only the reverse osmosis membrane element 85a or 85b of which the frequency of washing is high is washed, whereby it is possible to reduce waste of washing chemicals thereby to reduce the cost.

Further, it is only necessary to open the high pressure vessel 81a or 81b having the reverse osmosis membrane element 85a or 85b therein, it is possible to reduce effort and time required for the washing.

Further, the fouling matters deposited in the reverse osmosis membrane are removed by the action of the flow of the washing fluid on the reverse osmosis membrane, whereby it is possible to carry out washing where environmental burden is small without relying on washing ability of chemicals having a strong washing effect such as acids and alkalis.

(Fourth Embodiment)

Figure 5:
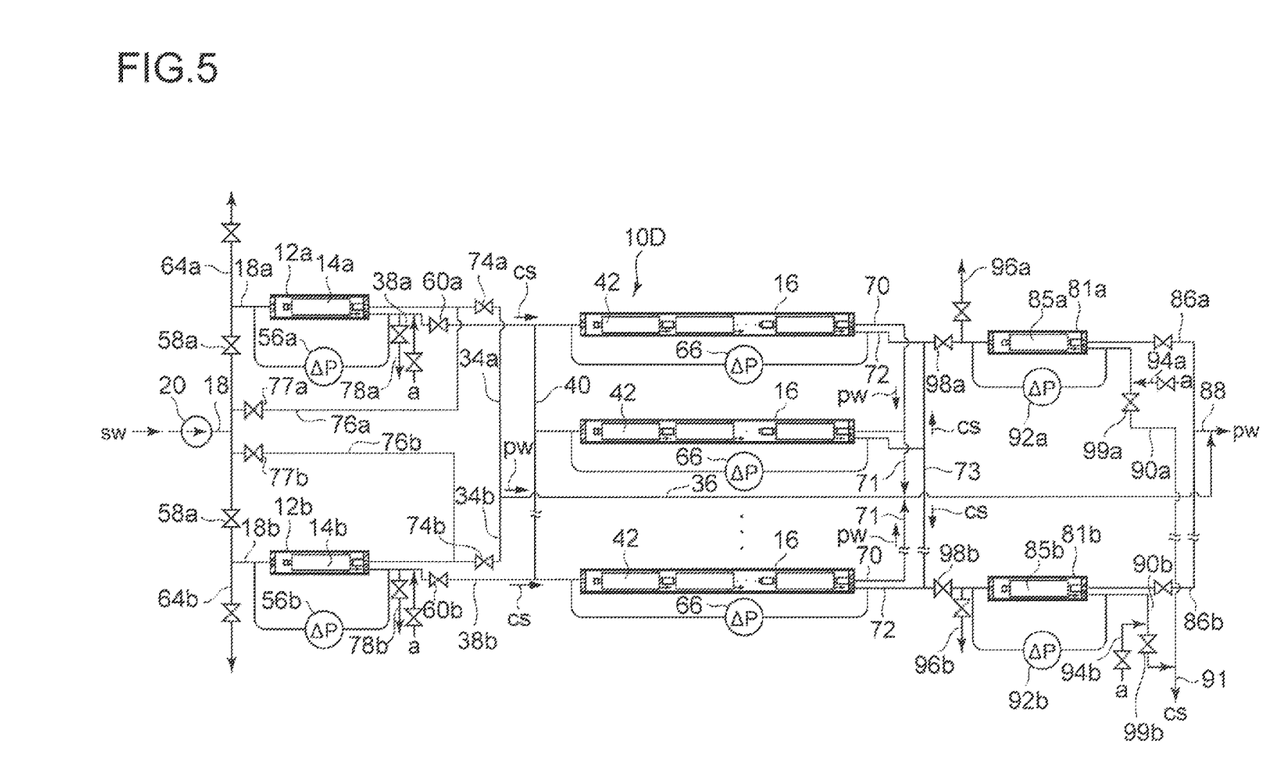
FIG. 5 is a flow diagram of a reverse osmosis membrane apparatus according to a fourth embodiment of the present invention.

A fourth embodiment of the present invention will now be described with reference to FIG. 5. In the reverse osmosis membrane apparatus 10D in the embodiment, clarified seawater sw supplied to the clarified seawater introducing passage 18 by the pump 20 is flown into the high pressure vessel 12a or 12b via the introducing branched passage 18a or 18b. The high pressure vessels 12a and 12b have therein the first-stage reverse osmosis membrane elements 14a and 14b, respectively. The clarified seawater sw is separated in the high pressure vessel 12a or 12b, and permeate water pw flown into the permeate water outflow passage 34a or 34b is flown out from the permeate water assembly pathway 36 to the permeate water assembly pathway 88.

Concentrated seawater cs flown out from the high pressure vessel 12a or 12b to the concentrated seawater branched passage 38a or 38b is flown to the concentrated seawater assembly pathway 40. A plurality of high pressure vessels 16 are arranged in parallel with respect to the concentrated seawater assembly pathway 40. Each of the high pressure vessels 16 has therein a plurality of the reverse osmosis membrane elements 42, i.e. from the second-stage reverse osmosis membrane element to the last stage reverse osmosis membrane element, which are arranged in series. The concentrated seawater cs flown to the concentrated seawater outflow passage 40 enters any one of the high pressure vessels 16 to be subjected to membrane separation. The permeate water pw flown from the high pressure vessels 16 to the permeate water outflow passage 70 joins in the permeate water assembly pathway 88 via the permeate water assembly pathway 71.

The concentrated seawater flown out from any of the high pressure vessels 16 to the concentrated seawater outflow passage 72 joins in the concentrated seawater assembly pathway 73. The high pressure vessels 81a and 81b are arranged in parallel with each other with regard to the concentrated seawater assembly pathway 73. The high pressure vessels 81a and 81b have therein the last-stage reverse osmosis membrane elements 85a and 85b, respectively. The concentrated seawater cs is flown from the concentrated seawater assembly pathway 73 into the high pressure vessel 81a or 81b to be subjected to membrane separation. The permeate water pw flown from the high pressure vessels 81a and 81b to the permeate water outflow passage 86a or 86b is flown out to the permeate water assembly pathway 88. The concentrated seawater cs flown from the high pressure vessels 81 and 81b to the concentrated seawater outflow passage 90a and 90b joins in the concentrated seawater assembly pathway 91 and then is discharged.

The high pressure vessels 12a, 12b and 16 and their inner structures are the same as the high pressure vessels 12a, 12b and 16 and their inner structures used in the first embodiment and the second embodiment. The high pressure vessels 81a and 81b and their inner structures are the same as the high pressure vessels 81a and 81b and their inner structures used in the third embodiment.

The high pressure vessel 12a is provided with a differential pressure meter 56a for detecting the differential pressure between the pressure of the clarified seawater sw flowing in the introducing branched passage 18a and the pressure of the concentrated seawater flowing in the concentrated seawater outflow passage 38a. The high pressure vessel 12b is provided with a differential pressure meter 56b for detecting the differential pressure between the pressure of the clarified seawater sw flowing in the introducing branched passage 18b and the pressure of the concentrated seawater flowing in the concentrated seawater outflow passage 38b.

Further, each of the plurality of the high pressure vessels 16 is provided with a differential pressure meter 66 for detecting the differential pressure between the pressure of the concentrated seawater cs flowing in the concentrated seawater assembly pathway 40 and the pressure of the concentrated seawater flowing in the concentrated seawater discharging passage 70.

Further, the high pressure vessel 81a is provided with a differential pressure meter 92a for detecting the difference between the pressure of the concentrated seawater cs flowing in the concentrated seawater assembly pathway 73 and the pressure of the concentrated seawater cs flowing in the concentrated seawater outflow passage 90a. The high pressure vessel 81b is provided with a differential pressure meter 92b for detecting the difference between the pressure of the concentrated seawater cs flowing in the concentrated seawater assembly pathway 73 and the pressure of the concentrated seawater cs flowing in the concentrated seawater outflow passage 90b.

Further, gate valves 74a and 74b are provided on the permeate water outflow passages 34a and 34b, respectively, to which permeate water pw is flown from the high pressure vessels 12a and 12b. Further, bypass pathway 76a branched from the introducing branched passage 18a on an upstream position of the gate valve 58a and connected to the permeate water outflow passage 34a on an upstream position of the gate valve 74a is provided. Further, bypass pathway 76b branched from the introducing branched passage 18b on an upstream position of the gate valve 58b and connected to the permeate water outflow passage 34b on an upstream position of the gate valve 74b is provided. Gate valves 77a and 77b are provided on the bypass pathway 76a and 76b, respectively, and the permeate water outflow passages 32a and 34b are provided with clarified seawater discharging passages 78a and 78b, respectively, for discharging clarified seawater sw supplied as a washing fluid in the washing step.

Washing fluid supply passages 94a and 94b are connected to the concentrated seawater outflow passages 90a and 90b, and gate valves 99a and 99b are provided on the concentrated seawater outflow passages 90a and 90b. The branched outflow passages 80a and 80b have washing fluid discharging passages 96a and 96b, respectively, which are branched therefrom, and are provided with gate valves 98a and 98b, respectively.

When a detected value by any one of the differential pressure meter exceeds a threshold value, introduction of to-be-treated water to the high pressure vessel corresponding to the differential pressure meter of which the detected value exceeds the threshold is stopped, and the washing is started. With regard to the washing of the high pressure vessel 12a or 12b, for example, as in the above description of the second embodiment, the gate valves 58a, 74a, and 60a are closed, and the gate valve 77a are opened. Then, the clarified seawater sw is supplied from the bypass pathway 76a to the permeate water outflow passage 34a at a pressure lower than the osmotic pressure generated by the reverse osmosis membrane of the reverse osmosis membrane element 14a by using the pump 20.

By such a configuration, the mixture flow of the permeate water pw and the clarified seawater sw reaches the reverse osmosis membrane of the reverse osmosis membrane element 14a, and only the permeate water pw in the mixture flow is passed through the reverse osmosis membrane. By the pressure difference between the clarified seawater sw with an osmosis pressure generated at this time and the permeate water pw having no osmosis pressure, the permeate water pw from the permeate water outflow passage 34a is allowed to pass through the reverse osmosis membrane. The fouling matters deposited in the reverse osmosis membrane can be peeled off by the permeate water pw passing through the reverse osmosis membrane.

The permeate water pw passed through the reverse osmosis membrane by the forward osmosis phenomenon is discharged from the washing fluid discharging passage 64a, and the clarified seawater sw supplied to the reverse osmosis membrane element 14a is discharged from the clarified seawater discharging passage 78a. In a case of washing the reverse osmosis membrane element 14b housed in the high pressure vessel 12b, washing may be carried out in the same manner.

With regard to washing of the high pressure vessel 81a or 81b, in the case of the high pressure vessel 81a, for example, as in the above description of the third embodiment, the gate valves 98a, 98b, 99a and 99b are operated to stop introducing clarified seawater sw to the reverse osmosis membrane element 81a, and the washing step is carried out.

In the washing step, firstly, washing fluid a is supplied from the washing fluid supply passage 94a to form a flow of the washing fluid so that the flow contacts with a surface of the reverse osmosis membrane element 85a, and then the washing fluid is discharged from the washing fluid discharging passage 96a. In a case where the reverse osmosis membrane element 85b housed in the high pressure vessel 81b is washed, the same operation is carry out. Also in the case of high pressure vessel 16, for which the frequency of washing is relatively low, washing may be carried out according to the method for the high pressure vessels 12a and 12b or the method for the high pressure vessels 81a and 81b.

According to this embodiment, as the high pressure vessels 12a and 12b having therein the first-stage reverse osmosis membrane elements 14a and 14b where the fouling amount is large, respectively, are arranged in parallel with each other with regard to the clarified seawater introducing passage 18, and the high pressure vessels 81a and 81b having therein the last-stage reverse osmosis membrane elements 85a and 85b, respectively, are arranged in parallel with each other with regard to the concentrated seawater assembly pathway 73, when one of the high pressure vessels is washed, operation of the other one can be continued. Accordingly, it is possible to keep the operating rate of the reverse osmosis membrane apparatus 10D and to operate the apparatus stably. Further, apart from the reverse osmosis membrane elements 42 housed in the high pressure vessel 16, only the reverse osmosis membrane element 14a or 14b of which the frequency of washing is high, or the reverse osmosis membrane element 85a or 85b is washed, whereby it is possible to reduce waste of washing chemicals thereby to reduce the cost.

Further, when the washing for high pressure vessels 12a and 12b or 81a and 81b is carried out, it is only necessary to open the high pressure vessel 12a or 12b having the reverse osmosis membrane element 14a or 14b therein, or it is only necessary to open the high pressure vessel 81a or 81b having the reverse osmosis membrane element 85a or 85b therein, it is possible to reduce effort and time required for the washing.

Further, as washing of the reverse osmosis membrane element is carried out by using osmosis pressure of the clarified seawater sw in the high pressure vessel 12a or 12b, it is possible to actuate the pump 20 with a reduced power.

Further, it is possible to carry out washing where environmental burden is small without using chemicals having a strong washing effect as the washing fluid.

Further, in the high pressure vessel 81a or 81b, the fouling matters deposited in the reverse osmosis membrane are removed by the action of the flow of the washing fluid on the reverse osmosis membrane, whereby it is possible to carry out washing where environmental burden is small without relying on washing ability of chemicals having a strong washing effect such as acids and alkalis.

In any of the above embodiments, a spiral-type reverse osmosis membrane element is used; however, in the present invention, a flat membrane-type reverse osmosis membrane element may be alternatively used.

INDUSTRIAL APPLICABILITY

According to the present invention, it is possible to reduce effort and time required for washing a reverse osmosis membrane apparatus applied to e.g. a seawater desalination plant and to increase operating rate of the reverse osmosis membrane apparatus thereby to operate the apparatus stably.

REFERENCE SIGNS LIST 10A, 10B, 10C, 10D, 100 Reverse osmosis membrane apparatus
12a, 12b, 81a, 81b High pressure vessel (First high pressure vessel)
22, 87 Inlet opening
24, 26, 83, 84 Outlet opening
14a, 14b, 85a, 85b Reverse osmosis membrane element (First reverse osmosis membrane element)
42 Reverse osmosis membrane element (Second reverse osmosis membrane element)
16 High pressure vessel (Second high pressure vessel)
16a Inlet opening
16b, 16c Outlet opening
18 Clarified seawater introducing passage
18a, 18b Introducing branched passage
20 Pump
28, 44 Center pipe
30, 48 End cap
31, 50 Brine seal
32, 46 Connector
34a, 34b, 52, 70, 86a, 86b Permeate water outflow passage
36, 71, 88 Permeate water assembly pathway
38a, 38b, 54, 72, 90a, 90b Concentrated seawater outflow passage
40, 73, 91 Concentrated seawater assembly pathway
56a, 56b, 66, 92a, 92b Differential pressure meter
58a, 58b, 60a, 60b, 74a, 74b, 77a, 77b, 98a, 98b, 99a, 99b Gate valve
62a, 62b, 94a, 94b Washing fluid supply passage
64a, 64b, 96a, 96b Washing fluid discharging passage
67 Calculation unit
68 Alarm generator
76a, 76b Bypass pathway
78a, 78b Clarified seawater discharging passage
80a, 80b Branched outflow passage
a Washing fluid
cs Concentrated seawater
cw Concentrated water
pw Permeate water
sw Clarified seawater
tw To-be-treated water

The invention claimed is:

1. A reverse osmosis membrane apparatus comprising:
an introducing passage for introducing to-be-treated water into the reverse osmosis membrane apparatus;
a plurality of first vessels arranged in parallel with each other so as to be connected to the introducing passage, each of the plurality of first vessels containing a single first reverse osmosis membrane element;
a second vessel disposed on a downstream side of the plurality of first vessels in a flow direction of the to-be-treated water, the second vessel containing a plurality of second reverse osmosis membrane elements arranged in series;
a plurality of differential pressure detectors provided for the plurality of first vessels, respectively, each of the differential pressure detectors being configured to detect a differential pressure between the introducing passage and a concentrated water outflow passage of a corresponding one of the plurality of first vessels;
a deposition amount calculator for calculating deposition amount of fouling matters on the first reverse osmosis membrane element for each of the plurality of first vessels on the basis of the detected differential pressure; and
a flow path switching valve configured to stop introducing the to-be-treated water into one or more of the plurality of first vessels in which the calculated deposition amount exceeds a threshold value and to permit the to-be-treated water to flow through the other of the first vessels and the second vessel selectively.

2. The reverse osmosis membrane apparatus according to claim 1, further comprising:
a washing fluid supplying part for supplying the first reverse osmosis membrane element of said one or more of the plurality of first vessels with washing fluid; and
a washing fluid discharging passage for discharging the washing fluid after washing of the first reverse osmosis membrane element of said one or more of the plurality of first vessels;
wherein the reverse osmosis membrane apparatus is configured so that fouling matters deposited in a reverse osmosis membrane of the first reverse osmosis membrane element in said one or more of the first vessels are peeled off by peeling action of the washing fluid on the reverse osmosis membrane of the first reverse osmosis membrane element in said one or more of the first vessels.

3. The reverse osmosis membrane apparatus according to claim 1, further comprising
an alarm generator for generating an alarm when the calculated deposition amount for one or more of the first vessels exceeds a threshold value.

4. The reverse osmosis membrane apparatus according to claim 1,
wherein a plurality of the second vessels are arranged in parallel with each other and connected to a concentrated water outflow passage provided for each of the first vessels.

5. A method of operating the reverse osmosis membrane apparatus according to claim 1, comprising:
a flow path switching step of operating the flow path switching valve to stop introducing the to-be-treated water into one or more of the plurality of first vessels in which the calculated deposition amount exceeds the threshold value and to permit the to-be-treated water to flow through the other of the first vessels and the second vessel selectively; and
a washing step of supplying with washing fluid a reverse osmosis membrane of the first reverse osmosis membrane element in said one or more of the first vessels to peel off fouling matters deposited in the reverse osmosis membrane of the first reverse osmosis membrane element in said one or more of the first vessels by flow of the washing fluid.

6. The method of operating the reverse osmosis membrane apparatus according to claim 5,
wherein
in the washing step, as the washing fluid, the to-be-treated water is supplied to the first reverse osmosis membrane element in said one or more of the first vessels via a permeate water passage at a pressure lower than an osmotic pressure caused by the reverse osmosis membrane of the first reverse osmosis membrane element, and
the permeate water is permitted to pass through the reverse osmosis membrane of the first reverse osmosis membrane element in said one or more of the first vessels from the permeate water passage side by a pressure difference between the osmotic pressure of the to-be-treated water and a pressure of the permeate water having no osmotic pressure.

7. A reverse osmosis membrane apparatus comprising:
an outlet passage in which permeate water generated from to-be-treated water by the reverse osmosis membrane apparatus flows;
a plurality of third vessels arranged in parallel with each other so as to be connected to the outlet passage, each of the plurality of third vessels containing a single third reverse osmosis membrane element;
a second vessel disposed on an upstream side of the plurality of third vessels in a flow direction of the to-be-treated water, the second vessel containing a plurality of second reverse osmosis membrane elements arranged in series;
a plurality of differential pressure detectors provided for the plurality of third vessels, respectively, each of the differential pressure detectors being configured to detect a differential pressure between an introducing passage of the to-be-treated water and a concentrated water outflow passage of a corresponding one of the plurality of third vessels;
a deposition amount calculator for calculating deposition amount of fouling matters on the third reverse osmosis membrane element for each of the plurality of third vessels on the basis of the detected differential pressure; and
a flow path switching valve configured to stop introducing the to-be-treated water into one or more of the plurality of third vessels in which the calculated deposition amount exceeds a threshold value and to permit the to-be-treated water to flow through the other of the third vessels and the second vessel selectively.

8. The reverse osmosis membrane apparatus according to claim 7, further comprising:
a washing fluid supplying part for supplying the third reverse osmosis membrane element of said one or more of the plurality of third vessels with washing fluid; and
a washing fluid discharging passage for discharging the washing fluid after washing of the third reverse osmosis membrane element of said one or more of the plurality of third vessels;
wherein the reverse osmosis membrane apparatus is configured so that fouling matters deposited in a reverse osmosis membrane of the third reverse osmosis membrane element in said one or more of the third vessels are peeled off by peeling action of the washing fluid on the reverse osmosis membrane of the third reverse osmosis membrane element in said one or more of the third vessels.

9. The reverse osmosis membrane apparatus according to claim 7, further comprising
an alarm generator for generating an alarm when the calculated deposition amount for one or more of the third vessels exceeds a threshold value.

10. The reverse osmosis membrane apparatus according to claim 7,
wherein a plurality of the second vessels are arranged in parallel with each other and connected to an incorporating passage of the to-be-treated water provided for each of the third vessels.

* * * * *